United States Patent
Xiao et al.

(10) Patent No.: US 9,332,093 B2
(45) Date of Patent: May 3, 2016

(54) METHOD AND DEVICE FOR ESTABLISHING PATH BETWEEN ELECTRONIC DEVICES

(71) Applicant: Lenovo (Beijing) Co., Ltd., Beijing (CN)

(72) Inventors: Jianfeng Xiao, Beijing (CN); Yong Zhi, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 229 days.

(21) Appl. No.: 14/081,382

(22) Filed: Nov. 15, 2013

(65) Prior Publication Data

US 2014/0140242 A1 May 22, 2014

(30) Foreign Application Priority Data

Nov. 19, 2012 (CN) .......................... 2012 1 0469991

(51) Int. Cl.
*H04L 29/06* (2006.01)
*H04W 4/20* (2009.01)
*H04W 76/02* (2009.01)

(52) U.S. Cl.
CPC ................ *H04L 69/24* (2013.01); *H04L 69/08* (2013.01); *H04W 4/20* (2013.01); *H04W 76/025* (2013.01); *H04W 76/023* (2013.01)

(58) Field of Classification Search
CPC ......... H04L 69/24; H04L 69/08; H04W 4/20; H04W 76/025
See application file for complete search history.

(56) References Cited

U.S. PATENT DOCUMENTS

| | | | | |
|---|---|---|---|---|
| 8,874,785 B2* | 10/2014 | Chaturvedi | ......... | H04L 61/2589 709/206 |
| 8,914,054 B2* | 12/2014 | Dimou | ................. | H04W 72/04 370/310 |
| 9,112,775 B2* | 8/2015 | Liu | ......................... | H04L 45/22 |
| 2011/0182269 A1* | 7/2011 | Yamagishi | .......... | H04W 76/028 370/331 |
| 2013/0223398 A1* | 8/2013 | Li | ....................... | H04W 72/085 370/329 |
| 2014/0315562 A1* | 10/2014 | Lim | .................... | H04W 76/023 455/450 |
| 2014/0321423 A1* | 10/2014 | Kalhan | ............... | H04W 76/023 370/330 |

* cited by examiner

*Primary Examiner* — Chi H Pham
*Assistant Examiner* — Weibin Huang
(74) *Attorney, Agent, or Firm* — Harness, Dickey & Pierce, P.L.C.

(57) ABSTRACT

A method and a device for connecting electronic devices are provided. The method includes: sending a first communication connection request to a second electronic device and establishing a first path based on a first protocol by a first electronic device; receiving a response message, determining whether the content of the response message satisfies a first preset condition; if the content of the response message satisfies the first preset condition, sending a second communication connection request to the second electronic device through the first path and establishing a second path based on a second protocol; where the first protocol is different from the second protocol and the first path correlates with the second path. With this method, different data is transmitted between two electronic devices through the first path and the second path simultaneously and data interaction and sharing are achieved in a simple way.

16 Claims, 5 Drawing Sheets

METHOD AND DEVICE FOR ESTABLISHING PATH BETWEEN ELECTRONIC DEVICES

The present application claims the priority to Chinese Patent Application No. 201210469991.9, entitled as "METHOD AND DEVICE FOR CONNECTING ELECTRONIC DEVICES", filed on Nov. 19, 2012 with State Intellectual Property Office of PRC, which is incorporated herein by reference in its entirety.

FIELD OF THE DISCLOSURE

The invention relates to electronic devices, and in particular, to a method and a device for connecting electronic devices.

BACKGROUND OF TECHNOLOGY

In the coming IOT (Internet of Things) era, interconnection between mobile terminals will become a trend of development, and in particular, cooperation and sharing between the mobile terminals will turn into an important direction. Hence, how to achieve the rapid, safe and reliable connection between terminals is an issue of great importance. In the prior art, although the telephony connection and the transmission of voice data in the Circuit Switched Domain may be implemented between the mobile terminals, it is impossible for a user of the mobile terminal to achieve the transmission and sharing of other data with the counterpart while making the phone call.

SUMMARY

In order to solve the problem above, a method and a device for connecting electronic devices are provided according to embodiments of the invention, in which a second path may be established using a first path established between two electronic devices, hence the transmission of different data via different transmission paths is facilitated and the interaction and sharing of date between the electronic devices are achieved in a simple way. The technical solutions are described as follows.

In one aspect, it is provided a method for connecting electronic devices, where the method is applied in a first electronic device and the method includes:

sending a first communication connection request to a second electronic device and establishing a first path with the second electronic device based on a first protocol by the first electronic device;

receiving a response message, determining whether the content of the response message satisfies a first preset condition, and obtaining a first determination result; and in the case that the first determination result indicates that the content of the response message satisfies the first preset condition, sending a second communication connection request to the second electronic device through the first path and establishing a second path with the second electronic device based on a second protocol, by the first electronic device;

where the first protocol is different from the second protocol and the first path correlates with the second path.

In a second aspect, it is provided a first electronic device, including:

a first communication unit adapted to send a first communication connection request to a second electronic device and establish a first path with the second electronic device based on a first protocol;

a first determination unit adapted to receive response message, determine whether the content of the response message satisfies a first preset condition, and obtain a first determination result; and a second communication unit adapted to send a second communication connection request to the second electronic device through the first path and establishes a second path with the second electronic device based on a second protocol in the case that the first determination result indicates that the content of the response message satisfies the first preset condition, where the first protocol is different from the second protocol and the first path correlates with the second path.

One advantage of the embodiments of the invention is as follows. In the embodiments of the invention, the first electronic device sends the first communication connection request to the second electronic device and establishes the first path with the second electronic device based on the first protocol; in the case that the first preset condition is satisfied, the first electronic device sends the second communication connection request to the second electronic device through the first path and establishes the second path with the second electronic device based on the second protocol. In this way, after establishing the first path with the second electronic device, the first electronic device establishes the second path using the first path, hence different data may be transmitted between two electronic devices through the first path and the second path simultaneously and the data interaction and sharing between mobile terminals are achieved conveniently.

BRIEF DESCRIPTION OF THE DRAWINGS

Drawings used in the description of embodiments are explained briefly as follows for better understanding of the technical solutions in the embodiments of the invention. Apparently, the drawings described in the following are just some of the embodiments of the invention. Other drawings can be obtained by those skilled in the art based on the drawings without inventive efforts.

DETAILED DESCRIPTION OF THE EMBODIMENTS

A method and a device for connecting electronic devices are provided according to embodiments of the invention, where a second path may be established using a first path established between two electronic devices, and different data may be transmitted through different data transmission paths, hence the interaction and sharing of data between devices may be implemented in a simple way.

For better understanding of the technical solution in the application by those skilled in the art, the technical solution in the embodiments of the application will be clearly and completely described hereinafter in conjunction with drawings. Apparently, the embodiments described are merely some embodiments of the application, rather than all embodiments. Any other embodiments obtained based on the embodiments in the application by those skilled in the art without any creative works should fall within the scope of protection of the application.

Figure 1:
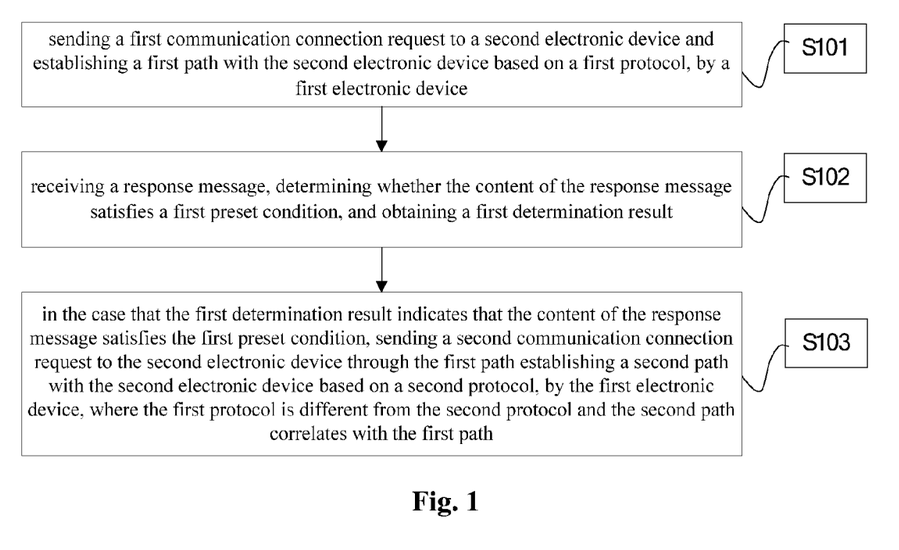
FIG. 1 is a schematic diagram of a method for connecting electronic devices according to a first embodiment of the invention.

Referring to FIG. 1, a schematic diagram of a method for connecting electronic devices according to a first embodiment of the invention is shown.

S101, sending a first communication connection request to a second electronic device and establishing a first path with the second electronic device based on a first protocol, by a first electronic device.

In practice, the first path may be a voice link and the first electronic device establishes the first path with the second electronic device through the Circuit Switched (CS) Domain. In the case that the first path is the voice link, the first protocol may be a protocol related to the cellular mobile technology, including Global System for Mobile communications (GSM), Code Division Multiple Path (CDMA), CDMA2000, etc. The type of the first protocol is not limited in the invention.

S102, receiving a response message, determining whether the content of the response message satisfies a first preset condition, and obtaining a first determination result.

In practice, the first preset condition may be configured to be that the content of the response message is that the second electronic device approves the first communication connection request.

S103, in the case that the first determination result indicates that the content of the response message satisfies the first preset condition, sending a second communication connection request to the second electronic device through the first path establishing a second path with the second electronic device based on a second protocol, by the first electronic device, where the first protocol is different from the second protocol and the second path correlates with the first path.

In practice, the second path may be a voice link and the first electronic device establishes the second path with the second electronic device through the Packet Switched (PS) Domain. Alternatively, the electronic device may establish the second path with the second electronic device through WiFi hot spots. The second protocol may be TCP/IP protocol.

The second path may correlate to the first path in a way that the state of the second path correlates with the state of the first path. The state of the second path may correlate to the state of the first path in a way that the second path is disconnected when the first path is disconnected.

The second path may correlate to the first path in a way that the first path is adapted to transmit first data, the second path is adapted to transmit second data, the first data is different from the second data, and the first data and the second data are transmitted simultaneously via the first path and the second path, respectively. In this way, the first electronic device may transmit different data through different paths simultaneously. In the case that the first path is the voice link, the first data is voice data; in the case that the second path is the data link, the second data is non-voice data.

Specific implementation process of step S103 is described in the following. According to the first embodiment of the invention, the first electronic device has a first communication identity and the second electronic device has a second communication identity, the first communication connection request sent by the first electronic device includes the first communication identity and the second communication identity. Step S103 may include the following steps:

S103A, performing authentication with the second electronic device by the first electronic device using the first communication identity and the second communication identity.

S103B, in the case that the authentication is successful, receiving second address information of the second electronic device sent from a server by the first electronic device.

S103C, sending the second communication connection request to the second electronic device by the first electronic device using the second address information of the second electronic device to establish the second path with the second electronic device.

According to the first embodiment of the invention, the first electronic device sends the first communication connection request to the second electronic device and establishes the first path with the second electronic device based on the first protocol; in the case that the first preset condition is satisfied, the first electronic device sends the second communication connection request to the second electronic device through the first path and establishes the second path with the second electronic device based on the second protocol; in this way, after establishing the first path with the second electronic device, the first electronic device establishes the second path by using the first path in order that different data is transmitted between two electronic devices through the first path and the second path simultaneously, hence the interaction and sharing of date between the electronic devices are achieved in a simple way.

Figure 2:
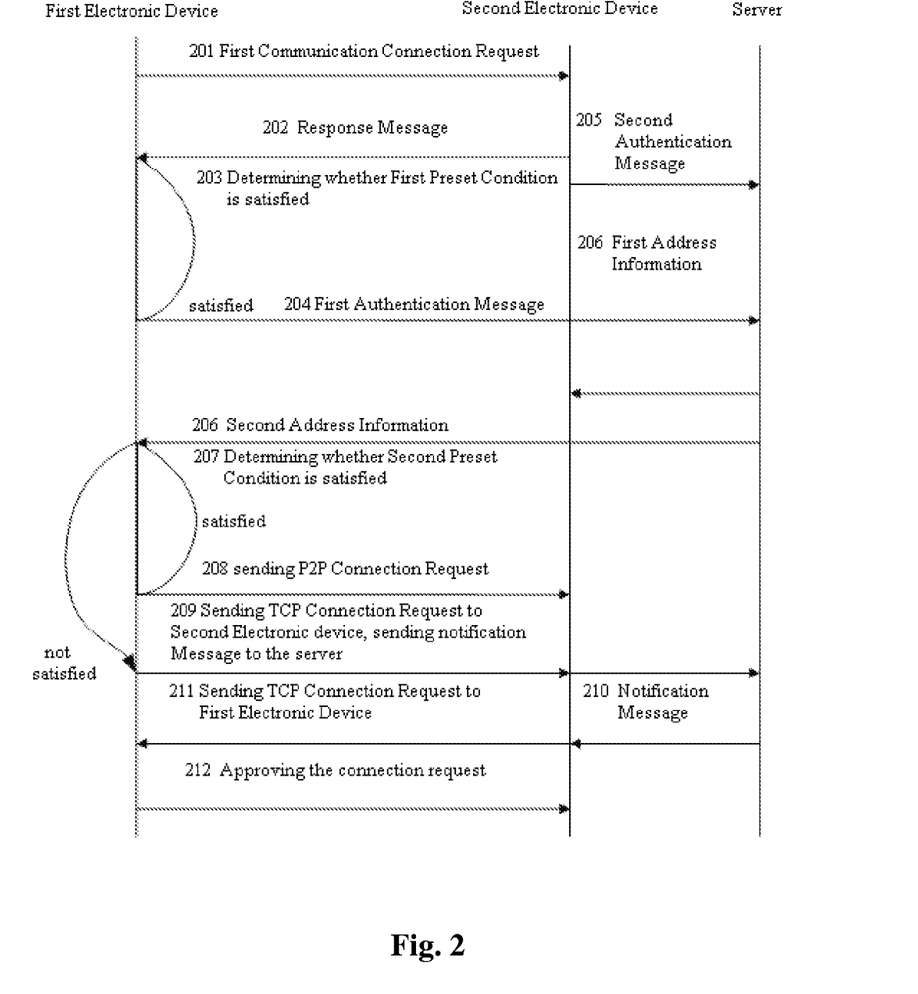
FIG. 2 is a schematic diagram of a method for connecting electronic devices according to a second embodiment of the invention.

Referring to FIG. 2, a schematic diagram of a method for connecting electronic devices according to the second embodiment of the invention is shown.

The process for establishing a second path by the first electronic device using the first path is described in detail hereinafter in conjunction with drawings. In this embodiment, the first path is a voice link and the second path is a data link.

S201, sending a first communication connection request to a second electronic device by the first electronic device.

The first electronic device has a first communication identity and the second electronic device has a second communication identity, the first communication connection request sent by the first electronic device includes the first communication identity and the second communication identity. In practice, the first communication identity may be a phone number in the case that the first electronic device is a mobile phone.

S202, receiving the first communication connection request and sending a response message to the first electronic device, by the second electronic device.

In practice, if the second electronic device approves to receive the first communication connection request sent by the first electronic device, the second electronic device sends the response message to the first electronic device as a feedback after being connected, where the response message indicates that the second electronic device approves to establish communication connection.

S203, determining whether the content of the response message satisfies a first preset condition and obtaining a first determination result, by the first electronic device.

According to the embodiment, in establishing the second path using the first path, firstly it should be confirmed that the first path is established successfully and the second electronic device is awakened. That is because, in order to establish the second path, both the opposite terminals of the path, i.e., the first electronic device and the second electronic device should be awakened and then data may be transmitted between the first electronic device and the second electronic device. Taking the mobile phone as an example, when the mobile phone is dormant, the Application Processor (AP) does not work and only the Communication Processor (CP) is on standby; by means of the call request, the CP of the second electronic device wakes up the AP and the awakened AP is prepared to establish the second path. In practice, it is preset that the first preset condition is satisfied in the case that the content of the received response message is that the second electronic device approves the first communication connection request. According to a communication network protocol, a corresponding command is returned after a successful communication connection, and it may be determined whether the communication connection is established successfully between the first electronic device and the second electronic device based on the command. An example is explained as follows. After the mobile phone is connected, a PHONE.CONNECTED command is reported by the mobile phone, and the system is aware that the mobile phone is connected according to this command; when the mobile phone is hung up, a PHONE.HANGUP command is reported and the system is aware that the mobile phone is hung up according to this command. Therefore, in the case that the content of the response message received by the first electronic device from the second electronic device is approving to establish the connection, for example, in the case that the PHONE. CONNECTED command is received, it is determined that the preset condition is satisfied. In the case that the second electronic device does not approve the first communication connection request, or the connection is failed because of no response or network reasons, corresponding response message is returned, and the first electronic device may determine whether the first preset condition is satisfied based on the content of the response message.

According to the embodiment, the second path may be established directly after the first path is established between the first electronic device and the second electronic device; or the establishment of the second path is triggered only in the case that a user operation satisfies the preset condition. Furthermore, before the first electronic device sends the second communication connection request to the second electronic device through the first path and establishes the second path with the second electronic device based on a second protocol, the method further includes: detecting the user operation, determining whether the user operation satisfies a third preset condition, and obtaining a third determination result; in the case that the third determination result indicates that the user operation satisfies the third preset condition, performing step S204. The third preset condition is a trigger condition for establishing the second path and may be set as needed. In practice, it may be preset that the establishment of the second path is triggered in the case that the input operation or gesture operation of the user satisfies the third preset condition. It may be understood by those skilled in the art that, the step for determining whether the user operation satisfies the third preset condition may be performed either before step S204 or before step S207.

S204, in the case that the first determination result indicates that the content of the response message satisfies the first preset condition, generating a first authentication password and sending a first authentication message to the server, by the first electronic device.

In practice, the first electronic device generates the first authentication password using the first communication identity and the second communication identity, and sends the first authentication message to the server. The first authentication message includes the first authentication password and first address information of the first electronic device. The first address information may include the public network IP address and the port number of the first electronic device. Here the server is mainly adapted to perform authentication and to assist the first electronic device and the second electronic device in establishing the second path, and the server may communication with the first electronic device and the second electronic device.

S205, generating a second authentication password and sending a second authentication message to the server by the second electronic device after approving the first communication connection request.

The second authentication password is generated by the second electronic device using the first communication identity and the second communication identity. The second authentication message includes the second authentication password and second address information of the second electronic device, and the second address information may include the public network IP address and the port number of the second electronic device.

It may be understood by those skilled in the art that, step S204 and step S205 may be performed concurrently or in a reversed sequence.

S206, performing authentication by the server; if the authentication is passed, sending the second address information of the second electronic device to the first electronic device and sending the first address information of the first electronic device to the second electronic device, by the server.

S207, determining whether the first electronic device and the second electronic device satisfy a second preset condition by the first electronic device using the first address information of the first electronic device and the second address information of the second electronic device and obtaining a second determination result, by the first electronic device. In the case that the second determination result indicates that the first electronic device and the second electronic device satisfy the second preset condition, step S208 is performed; in the case that the second determination result indicates that the first electronic device and the second electronic device do not satisfy the second preset condition, step S209 is performed.

In the case that the first address information of the first electronic device includes the IP address of the first electronic device and the second address information of the second electronic device includes the IP address of the second electronic device, in step S207, the determination on the second preset condition is specifically as follows: comparing the IP address of the first electronic device with the IP address of the second electronic device to determine whether the first electronic device and the second electronic device are in a same Local Area Network, determining that the second preset condition is satisfied if the first electronic device and the second electronic device are in the same Local Area Network, or determining that the second preset condition is not satisfied if the first electronic device and the second electronic device are not in the same Local Area Network.

S208, in the case that the second determination result indicates that the first electronic device and the second electronic device satisfy the second preset condition, sending a point-to-point (P2P) connection request to the second electronic device by the first electronic device.

Here the first electronic device sends the P2P connection request to the second electronic device directly to establish the P2P connection.

S209, initiating a TCP connection request to the second electronic device using the second address information by the first electronic device.

In practice, the first electronic device sends the TCP connection request to the second electronic device. The first electronic device performs a tunneling toward the public network IP address of the second electronic device, and this connection may be recorded by the gateway of the first electronic device.

S210, informing the second electronic device to initiate the TCP connection, by the server.

S211, initiate the TCP connection to the first electronic device by the second electronic device.

The second electronic device sends a tunneling request (the TCP connection request) to the public network IP address of the first electronic device, and since the gateway of the first electronic device has recorded one connection between the first electronic device and the second electronic device, this connection is considered reliable and the connection request may be approved when the first electronic device receives the second communication connection request from the second electronic device.

S212, approving the connection request from the second electronic device and establishing the second path successfully by the first electronic device.

It may be understood by those skilled in the art that, in other embodiments, the authentication operation of step S204 may be executed after the first electronic device sends the first communication connection request to the second electronic device, and the second address information of the second electronic device is obtained. The determination with regard to the first preset condition in Step S203 may be performed after a successful authentication. In this way, the preparation for establishing the second path may be performed when waiting for the second electronic device to respond to the first communication connection request, and the efficiency of connection may be enhanced consequently. It should be noted that any other embodiments obtained based on the embodiment of the invention by those skilled in the art without any creative works should fall within the scope of protection of the invention.

So far how the first electronic device establishes the second path using the first path is described in detail according to an embodiment of the invention. According to the second embodiment of the invention, the first electronic device may establish a second path using a first path, where the first path is adapted to transmit first data and the second path is adapted to transmit second data different from the first data, and the first data and the second data are transmitted simultaneously via the first path and the second path, respectively. With the method according to the second embodiment of the invention, different data is transmitted simultaneously between two electronic devices through the first path and the second path, and interaction and sharing of date between the terminals are achieved in a convenient way.

The application scenario after the first electronic device and the second electronic device establish the second path is explained in detail in the following.

Figure 3:
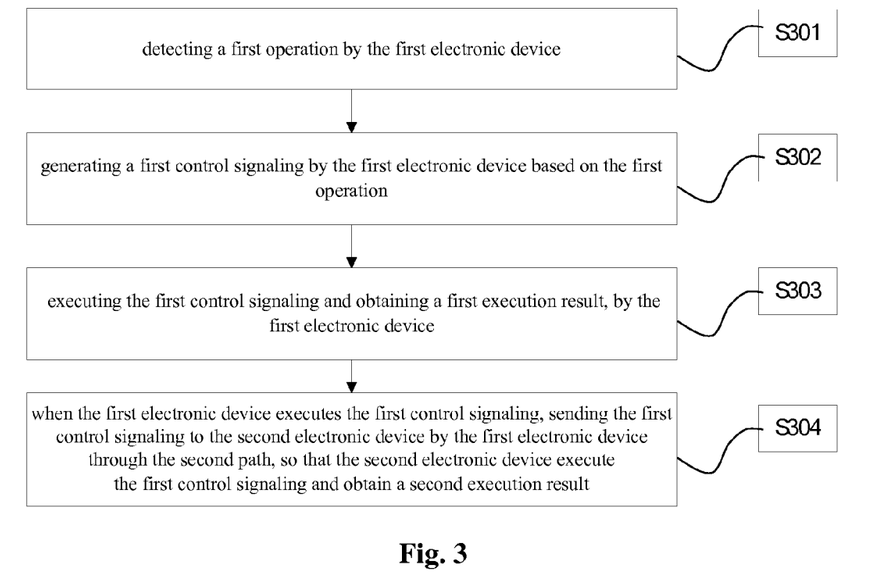
FIG. 3 is a schematic diagram of a method for connecting electronic devices according to a third embodiment of the invention.

Referring FIG. 3, a schematic diagram of a method for connecting electronic devices according to the third embodiment of the invention is shown.

According to the third embodiment of the invention, the sharing and coordination of data using a second path after a first path is established is explained in detail. For the purpose of illustration, taking the case that the first path is a voice link and the second path is a data link as an example.

A specific application scenario is explained as follows. Taking making a phone call as an example, after a first electronic device and a second electronic device establish a telephone communication connection, the need for data sharing, e.g., the requirements that both sides of a telephone conference keep on a same page of a shared file, when one page is turned on one side the page is also turned on the other side correspondingly and automatically, and when a note is made to the file by one side the note is also presented to the other side, may be achieved with the method according to the third embodiment of the invention. Apparently, this application scenario is exemplary and is not intended to limit the invention, and the method according to the embodiment of the invention may also be applied in other aspects.

S301, detecting a first operation by the first electronic device.

The first operation is an operation on the first electronic device by a user, such as, turning a page, noting the file, inputting, etc.

S302, generating a first control signaling by the first electronic device based on the first operation.

S303, executing the first control signaling and obtaining a first execution result, by the first electronic device.

S304, when the first electronic device executes the first control signaling, sending the first control signaling to the second electronic device by the first electronic device through the second path, so that the second electronic device execute the first control signaling and obtain a second execution result, where the second execution result is the same as the first execution result.

The first electronic device sends the first control signaling to the second electronic device through the second path, so that the second electronic device executes the same control signaling and obtains the same execution result, and hence the cooperation between the first electronic device and the second electronic device is achieved.

Figure 4:
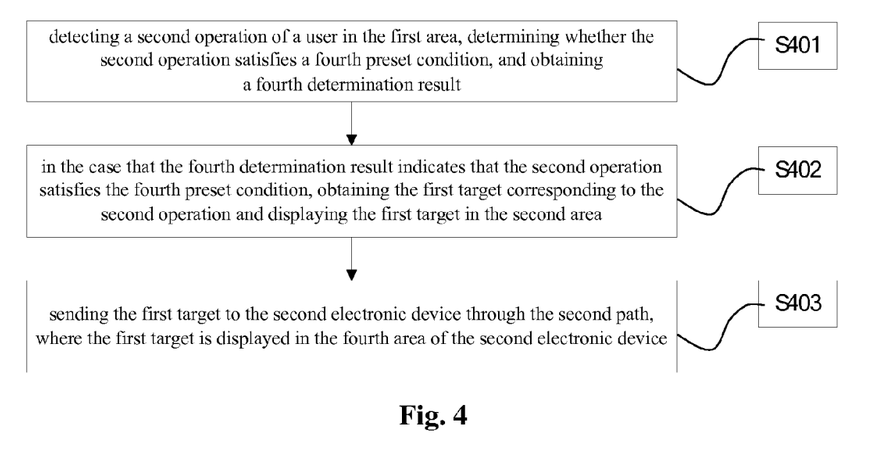
FIG. 4 is a schematic diagram of a method for connecting electronic devices according to a fourth embodiment of the invention.

Referring FIG. 4, a schematic diagram of a method for connecting electronic devices according to the fourth embodiment of the invention is shown.

According to this embodiment, a first electronic device includes at least a first area and a second area and a second electronic device includes at least a fourth area. The first area of the first electronic device corresponds to third data and the second area of the first electronic device corresponds to fourth data, where the third data is configured to be in a protected state and the fourth data is configured to be in a shared state. The fourth area of the second electronic device corresponds to fifth data, where the fifth data is configured to be in the shared state and the fifth data is same as the third data. In practice, the first area of the first electronic device is a private area and the second area of the first electronic device is a shared area. The first area is only accessible to the first electronic device. Here, the third data is configured to be in the protected state, which means that the third data can only be accessed locally and can not be accessed remotely, i.e., the third data is private data and is in an unshared state. In this way, a user may store the private data in the first area and store data to be shared with other electronic devices in the second area.

S401, detecting a second operation of a user in the first area, determining whether the second operation satisfies a fourth preset condition, and obtaining a fourth determination result.

The second operation is an operation associated with moving a target. A possible implementation to determine whether the second operation satisfies the fourth preset condition and to obtain the fourth determination result is: in the case that the second operation is an operation of sliding from the first area to the second area, determining that the second operation satisfies the fourth preset condition. For example, in the case that the user operates a first target, which is located in the first area, with a pointing object, and executes the dragging operation to slide the first target from the first area to the second area, the fourth preset condition may be considered satisfied.

Another possible implementation to determine whether the second operation satisfies the fourth preset condition and to obtain the fourth determination result is: in the case that a first touch point associated with the second operation corresponds to the first object in the first area and a second touch point associated with the second operation corresponds to a first location in the second area, determining that the second operation satisfies the fourth preset condition. For example, the user touches the first target in the first area with a pointing object and the first touch point is generated; then the user touches the first location in the second area and the second touch point is generated. At this time, it may be determined that the second operation satisfies the fourth preset condition. The first target corresponding to the first touch point is a target the user wants to move, and the first location corresponding to the second touch point is a target location where the user moves the target to. These operations are representative user operations of moving the first target from the first area to the second area.

S402, in the case that the fourth determination result indicates that the second operation satisfies the fourth preset condition, obtaining the first target corresponding to the second operation and displaying the first target in the second area.

Here the first target corresponding to the second operation is obtained, and the first target is displayed in the shared area, i.e., the second area.

S403, sending the first target to the second electronic device through the second path, where the first target is displayed in the fourth area of the second electronic device.

The first target is sent through the second path, so that the first target is displayed in the shared area of the second electronic device.

Figure 5:
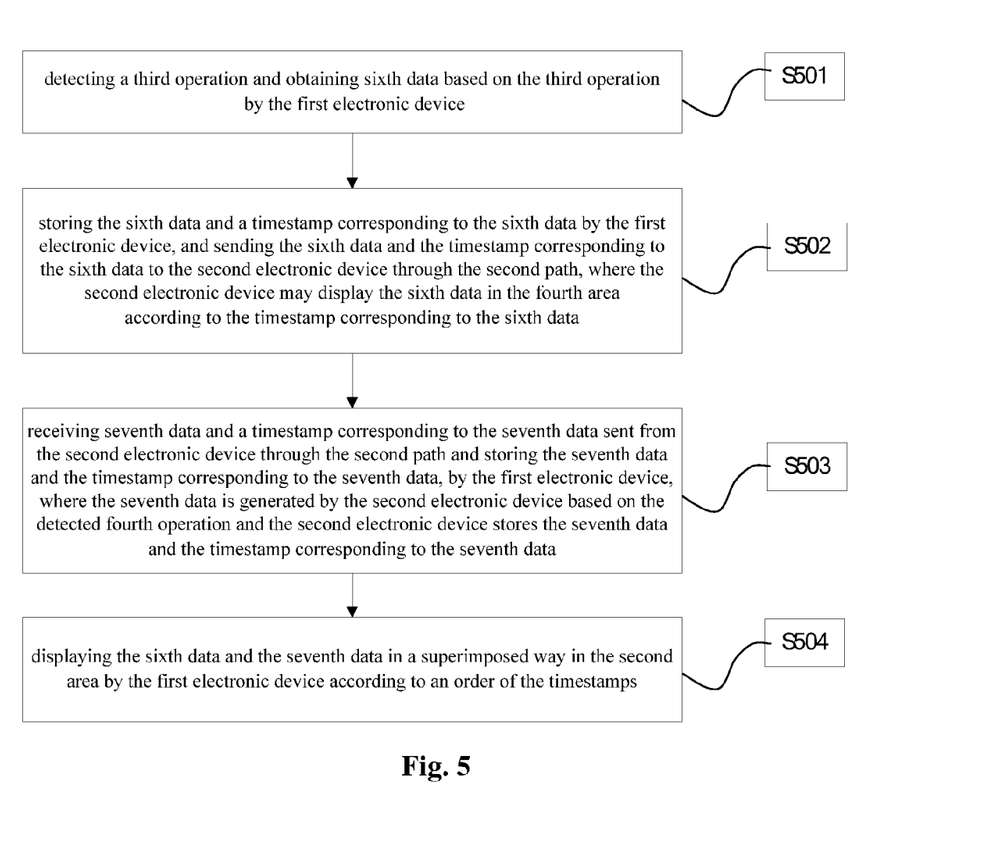
FIG. 5 is a schematic diagram of a method for connecting electronic devices according to a fifth embodiment of the invention.

Referring FIG. 5, a schematic diagram of a method for connecting electronic devices according to the fifth embodiment of the invention is shown.

According to the fifth embodiment, a first electronic device includes a second area and a second electronic device includes a fourth area, where the second area and the fourth area are both shared areas.

S501, detecting a third operation and obtaining sixth data based on the third operation by the first electronic device.

S502, storing the sixth data and a timestamp corresponding to the sixth data by the first electronic device, and sending the sixth data and the timestamp corresponding to the sixth data to the second electronic device through the second path, where the second electronic device may display the sixth data in the fourth area according to the timestamp corresponding to the sixth data.

S503, receiving seventh data and a timestamp corresponding to the seventh data sent from the second electronic device through the second path and storing the seventh data and the timestamp corresponding to the seventh data, by the first electronic device, where the seventh data is generated by the second electronic device based on the detected fourth operation and the second electronic device stores the seventh data and the timestamp corresponding to the seventh data.

S504, displaying the sixth data and the seventh data in a superimposed way in the second area by the first electronic device according to an order of the timestamps.

A specific example is set forth as follows to explain the fifth embodiment. For example, when the first electronic device and the second electronic device are in a telephone conference, the requirement of cooperative picturing may be satisfied with the method according to the fifth embodiment of the invention. As an example, when the first electronic device executes the third operation, e.g., an operation of picturing, a first track is generated, the sixth data corresponding to the operation may be the captured track of strokes, and the first electronic device stores the captured first track locally; similarly, when the second electronic device executes an operation of picturing, a second track is generated and the second electronic device stores the captured second track locally. In order to make both the first electronic device and the second electronic device to display the first track and the second track simultaneously, the first electronic device sends the first track and a timestamp corresponding to the first track to the second electronic device through the second path, and the second electronic device sends the second track and a timestamp corresponding to the second track to the first electronic device through the second path. At this time, the first electronic device stores the first track and the second track, and displays the first track and the second track in a superimposed way on the second area according to an order of the timestamps. Similarly, the second electronic device may display the first track and the second track in a superimposed way on the fourth area according to an order of the timestamps.

According to another embodiment of the invention, the methods in the third embodiment and the fifth embodiment may be applied in cooperation. For example, when the first electronic device and the second electronic device are making a phone call, user operations in the cooperative map guidance, such as dragging or zooming the map performed on one electronic device may also be performed similarly on the other electronic device of the phone call, by means of the method according to the third embodiment of the invention. In the case that both sides need to perform track picturing on the map, the method according to the fifth embodiment may be applied.

According to other embodiments of the invention, sharing and combination of the data may be implemented after establishing the second path. In one embodiment, the first electronic device receives eighth data sent from the second electronic device through the second path, and displays the ninth data of the first electronic device and the eighth data of the second electronic device in a combined manner. For example, the first electronic device may receive a schedule sent from the second electronic device and combines the data in the schedule sent from the second electronic device with the data in a local schedule, in order to display a date available for the both sides and to specify the time for meeting. In another embodiment, the first electronic device and the second electronic device may implement the cooperation of screens and permit to receive commands from each other.

It should be understood by those skilled in the art that the above embodiments may be implemented independently or in combination. Any other embodiments obtained by those skilled in the art without creative works shall fall within the scope of protection of the invention.

Figure 6:
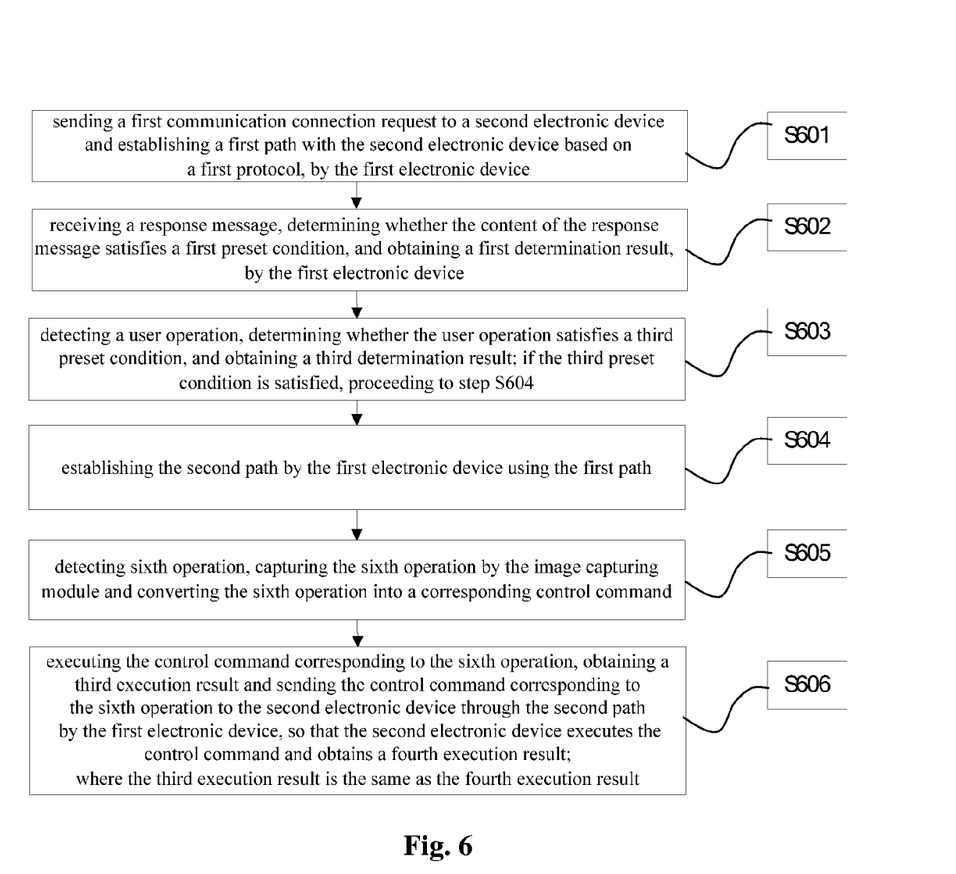
FIG. 6 is a schematic diagram of a method for connecting electronic devices according to a sixth embodiment of the invention.

Referring FIG. 6, a schematic diagram of a method for connecting electronic devices according to the sixth embodiment of the invention is shown.

In particular, the method according to this embodiment may be applied in a mobile terminal with a special structure.

Detailed description is given in the following. It should be understood by those skilled in the art that the methods according to the above embodiments may also be applied in the mobile terminal with the special structure.

The method according to the sixth embodiment may be applied in a first electronic device including an image projection module and an image capturing module, where a projection area of the image projection module at least partially coincides with a capturing area of the image capturing module. In usage, the first electronic device may project the data needed to be displayed through the image projection module. Preferably, a user may use the image capturing module to capture a target in a first image capturing area to obtain a first process target, process the first process target to generate second information, and project the second information onto the target through the image projection module. In this way, because the first process target viewed by the user and the processed information finally displayed in the projection are both shown on the target being captured (i.e., the target being viewed), it is unnecessary for the user to switch between the viewed target and the screen of the mobile phone, which is convenient for the user.

Some applications of the electronic device including the image capturing module and the image projection module are described as follows.

S601, sending a first communication connection request to a second electronic device and establishing a first path with the second electronic device based on a first protocol, by the first electronic device.

S602, receiving a response message, determining whether the content of the response message satisfies a first preset condition, and obtaining a first determination result, by the first electronic device.

In practice, in the case that the content of the response message is that the second electronic device approves the first communication connection request, it is determined that the first preset condition is satisfied. The following steps are not performed if the first preset condition is not satisfied.

S603, detecting a user operation, determining whether the user operation satisfies a third preset condition, and obtaining a third determination result; if the third preset condition is satisfied, proceeding to step S604.

When the image projection module in the first electronic device is enabled, first data may be displayed through projection. At this time, if the first data is operated by the user and an execution result corresponding to the operation is required to be displayed on the second electronic device simultaneously, the operation of establishing a second path may be triggered through a preset fifth operation. Accordingly, the third preset condition may be a preset user operation in the projection area, such as, a preset gesture, etc. Obviously, enabling the image projection module may also be configured as the third preset condition to trigger the establishment of the second path. It should be noted that, in the case that the trigger condition is the preset user operation in the projection area, the image capturing module is adapted to capture the fifth operation of the user and determine whether the third preset condition is satisfied through image recognition.

S604, establishing the second path by the first electronic device using the first path.

The process of establishing the second path is same as the process according to embodiment 1 and the second embodiment and is not described in detail herein. In particular, the method of establishing the second path using the first path according to the embodiments above may bring much convenience to the first electronic device including the image capturing module and the image projection module provided in this disclosure. This is because when using the electronic device, it is inconvenient for the user to perform input operation in the projection area, for example, the approach that the user inputs authentication password in the area where the image projection area coincides with the image capturing area and the image capturing module of the first electronic device performs the image recognition is very difficult. Nevertheless, with the method provided in the embodiments of the invention, the authentication and the establishment of the second path may be implemented automatically when establishing the first path without the need for inputting the authentication password and the IP address of the second electronic device manually by the user, which is applicable and convenient for the electronic device in this special structure and with this function.

S605, detecting sixth operation, capturing the sixth operation by the image capturing module and converting the sixth operation into a corresponding control command.

It should be noted that, the sixth operation may be the same as the fifth operation. That is to say, in the case that the image capturing module captures the sixth operation and it is determined by means of image recognition that the third preset condition is satisfied, the step of establishing the second path by using the first path is executed. In the case that the second path is established successfully, the first electronic device converts the sixth operation into the corresponding control command. In other words, the establishment of the second path may be triggered by one user operation, and the sharing and coordination of data is achieved after establishing the second path.

S606, executing the control command corresponding to the sixth operation, obtaining a third execution result and sending the control command corresponding to the sixth operation to the second electronic device through the second path by the first electronic device, so that the second electronic device executes the control command and obtains a fourth execution result; where the third execution result is the same as the fourth execution result.

After recognizing the sixth operation of the user through the image capturing module, the first electronic device executes the control command corresponding to the operation and obtains the third execution result. Preferably, the first electronic device may further project the third execution result through the image projection module. An example is set forth as follows. When the image projection module is enabled by the user and a file is projected into the projection area, the first electronic device may send the projected content to the second electronic device through the second path in order to implement data sharing. When the user operates the file in the projection area, for instance, the user presses a page turning button in the file displayed in the projection area or executes a preset operation, e.g., sliding with a finger from right to left to achieve the effect of turning pages, in the projection area (image capturing area), the image capturing module of the first electronic device captures the user operation and perform target recognition to generate the corresponding control command for turning the page of the file and projecting the execution result of turning pages, i.e., the page-turned file, through the image projection module. For the purpose that the second electronic device performs the same operation on the shared file and achieves the same effect, the first electronic device sends the control command corresponding to the user operation to the second electronic device through the second path, so that the second electronic device executes the same control command and achieves the same execution effect. The example above is illustrative and is not intended to limit the invention; the invention may be applied in other aspects.

Figure 7:
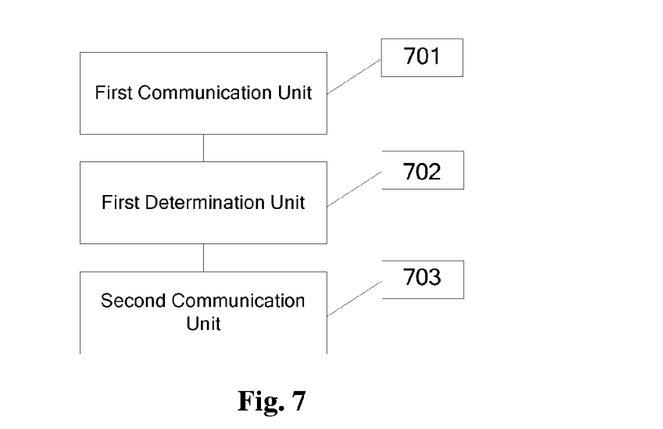
FIG. 7 is a schematic diagram of an electronic device according to an embodiment of the invention.

Referring to FIG. 7, a schematic diagram of a first electronic device according to an embodiment of the invention is shown.

The first electronic device includes:

a first communication unit 701 adapted to send a first communication connection request to a second electronic device and establish a first path with the second electronic device based on a first protocol;

a first determination unit 702 adapted to receive a response message, determine whether the content of the response message satisfies a first preset condition, and obtain a first determination result; and a second communication unit 703 adapted to send a second communication connection request to the second electronic device through the first path and establish a second path with the second electronic device based on a second protocol in the case that the first determination result indicates that the content of the response message satisfies the first preset condition, where the first protocol is different from the second protocol and the first path correlates with the second path.

Preferably, the first electronic device has a first communication identity and the second electronic device has a second communication identity, the first communication connection request sent by the first electronic device includes the first communication identity and the second communication identity, and the second communication unit includes:

an authentication unit adapted to perform authentication with the second electronic device using the first communication identity and the second communication identity;

an address receiving unit adapted to receive second address information of the second electronic device sent by a server in the case that the authentication is successful; and a connection unit adapted to send the second communication connection request to the second electronic device using the second address information of the second electronic device to establish the second path with the second electronic device.

Preferably, the authentication unit includes:

a first generating unit adapted to generate a first authentication password using the first communication identity and the second communication identity; and a first sending unit adapted to send a first authentication message to a server, where the server performs authentication based on the first authentication message sent from the first electronic device and a second authentication message sent from the second electronic device, the first authentication message includes the first authentication password and first address information of the first electronic device, the second authentication message includes second authentication password and second address information of the second electronic device, and the second authentication password is generated by the second electronic device using the first communication identity and the second communication identity.

Preferably, the connection unit includes:

a second determination unit adapted to determine whether the first electronic device and the second electronic device satisfy a second preset condition using the first address information of the first electronic device and the second address information of the second electronic device and obtain a second determination result;

a first connection request unit adapted to send a P2P connection request to the second electronic device in the case that the second determination result indicates that the first electronic device and the second electronic device satisfy the second preset condition; and a second connection request unit adapted to initiate a TCP connection request to the second electronic device using the second address information in the case that the second determination result indicates that the first electronic device and the second electronic device do not satisfy the second preset condition, where the server informs the second electronic device to initiate the TCP connection request to the first electronic device, and the first electronic device accepts the TCP connection request sent from the second electronic device and establishes the second path with the second electronic device.

Preferably, the first address information of the first electronic device includes an IP address of the first electronic device, the second address information of the second electronic device includes an IP address of the second electronic device, and the second determination unit is adapted to:

compare the IP address of the first electronic device and the IP address of the second electronic device to determine whether the first electronic device and the second electronic device are located in a same Local Area Network, determine that the second preset condition is satisfied if the first electronic device and the second electronic device are in the same Local Area Network, or determine that the second preset condition is not satisfied if the first electronic device and the second electronic device are not in the same Local Area Network.

Preferably, the second path correlates with the first path in a way that:

the second path is disconnected when the first path is disconnected; and/or the first path is adapted to transmit first data and the second path is adapted to transmit second data, where the first data is different from the second data and the first data and the second data are transmitted simultaneously via the first path and the second path, respectively.

Preferably, the first electronic device further includes:

a first detection unit adapted to detect a user operation, determine whether the user operation satisfies a third preset condition and obtain a third determination result a third determination unit adapted to activate the second communication unit in the case that the third determination result indicates that the user operation satisfies the third preset condition.

Preferably, the first electronic device further includes:

a second detection unit adapted to detect a first operation;

a second generation unit adapted to generate a first control signaling based on the first operation;

a first execution unit adapted to execute the first control signaling and obtain a first execution result; and a second sending unit adapted to send the first control signaling to the second electronic device through the second path when the first control signaling is executed by the first electronic device, where the second electronic device executes the first control signaling and obtains a second execution result and the second execution result is same as the first execution result.

Preferably, the first electronic device at least includes a first area and a second area, the second electronic device at least includes a fourth area, the first electronic device further includes:

a third detection unit adapted to detect a second operation of the user in the first area, determine whether the second operation satisfies a fourth preset condition, and obtain a fourth determination result, where the second operation is an operation associated with moving a target;

a first display unit adapted to obtain a first target corresponding to the second operation in the case that the fourth determination result indicates that the second operation satisfies the fourth preset condition and display the first target in the second area; and a third sending unit adapted to send the first target to the second electronic device through the second path, where the second electronic device displays the first target in the fourth area, the first area of the first electronic device corresponds to third data configured to be in a protected state, the second area of the first electronic device corresponds to fourth data configured to be in a shared state, the fourth area of the second electronic device corresponds to fifth data configured to be in the shared state and the fifth data is same as the third data.

Preferably, the third detection unit is adapted to determine that the second operation satisfies the fourth preset condition in the case that the second operation is an operation of sliding from the first area to the second area; or the third detection unit is adapted to determine that the second operation satisfies the fourth preset condition in the case that a first touch point associated with the second operation corresponds to the first object in the first area and a second touch point associated with the second operation corresponds to a first location in the second area.

Preferably, the first electronic device includes the second area and the second electronic device includes the fourth area, the first electronic device further includes:

a fourth detection unit adapted to detect a third operation and to obtain sixth data based on the third operation;

a first storage unit adapted to store the sixth data and a timestamp corresponding to the sixth data, receive seventh data and a timestamp corresponding to the seventh data sent by the second electronic device, and store the seventh data and the timestamp corresponding to the seventh data, where the seventh data is generated by the second electronic device based on a detected fourth operation and the seventh data and the timestamp corresponding to the seventh data are stored by the second electronic device;

a fourth sending unit adapted to send the sixth data and the timestamp corresponding to the sixth data to the second electronic device through the second path, wherein the second electronic device may display the sixth data in the fourth area based on the timestamp corresponding to the sixth data; and a second display unit adapted to display the sixth data and the seventh data in a superimposed way in the second area according to an order of the timestamps.

Preferably, the first path is a voice link and the second path is a data link.

Preferably, the first electronic device provided in the invention includes an image projection module and an image capturing module, where a projection area of the image projection module at least partially coincides with a capturing area of the image capturing module. The image capturing module is adapted to capture an image in a first image capturing area, recognize the captured image and obtain a recognition result.

Furthermore, the electronic device further includes a control command conversion unit adapted to convert the recognition result obtained by the image capturing module into a corresponding control command.

The first electronic device further includes a control command execution unit adapted to execute the control command sent from the control command conversion unit and obtain a third execution result.

The image projection unit is further adapted to project the third execution result into the projection area.

The sending unit(s) of the first electronic device is (are) further adapted to send the control command generated by the control command conversion unit to the second electronic device through the second path in order that the second electronic device executes the control command and obtains a fourth execution result, where the fourth execution result is same as the third execution result.

It should be noted that the relationship terminologies such as "first", "second" and the like are only used herein to distinguish one entity or operation from another, rather than to necessitate or imply that the actual relationship or order exists between the entities or operations. Furthermore, terms of "include", "comprise" or any other variants are intended to be non-exclusive. Therefore, a process, method, article or device including a plurality of elements includes not only the elements but also other elements that are not enumerated, or also include the elements inherent for the process, method, article or device. Unless expressively limited otherwise, the statement "comprising (including) one . . . " does not exclude the case that other similar elements may exist in the process, method, article or device.

The invention may be described in the general context of computer executable instructions executed by a computer, for example, a program module. Generally, the program module includes a routine, a program, an object, a component, a data structure or the like, which are adapted to execute a specified task or implement a particular abstract data type. The invention may also be implemented in distributed computing environment, in which a task is executed by remote processing devices connected through a communication network. In the distributed computing environment, the program module may be located in the storage medium, including storage devices, of a local or remote computer.

The embodiments of the invention are described in a progressive way, each of which emphasizes the differences from others, and the same or similar contents of the embodiments may be referred to each other. In particular, the description of the device embodiment is simple because it is similar to the method embodiment and the method embodiment may be referred to for better understanding of the device embodiment. The device embodiment described above is only exemplary, in which the units described as separate components may be or not be separated physically, components shown as units may be or not be physical units, i.e., the components may be located at one place or distributed as multiple network units. Some or all of the modules may be selected to implement the objective of the solution of the embodiments as required. Those skilled in the art can understand and practice the disclosure without any creative works.

Specific embodiments of the present invention are set forth above. However, it is to be noted that various changes and modifications may be made by those skilled in the art without departing from the principle of the invention, and these changes and modifications should fall in the scope of protection of this disclosure.

The invention claimed is:

1. A method for connecting electronic devices, wherein the method is applied in a first electronic device and comprises:
sending a first communication connection request to a second electronic device to establish a first path with the second electronic device based on a first protocol, by the first electronic device;
receiving a response message, determining whether the content of the response message satisfies a first preset condition, and obtaining a first determination result; and
in the case that the first determination result indicates that the content of the response message satisfies the first preset condition, sending a second communication connection request to the second electronic device through the established first path to establish a second path with the second electronic device based on a second protocol, by the first electronic device;

wherein the first protocol is different from the second protocol and the second path correlates with the first path.

2. The method according to claim 1, wherein the first electronic device has a first communication identity and the second electronic device has a second communication identity, the first communication connection request sent by the first electronic device comprises the first communication identity and the second communication identity; the step of sending the second communication connection request to the second electronic device by the first electronic device through the first path and establishing the second path with the second electronic device based on the second protocol comprises:

performing authentication with the second electronic device by the first electronic device using the first communication identity and the second communication identity;

in the case that the authentication is successful, receiving second address information of the second electronic device from a server by the first electronic device; and sending the second communication connection request to the second electronic device by the first electronic device using the second address information of the second electronic device to establish the second path with the second electronic device.

3. The method according to claim 2, wherein the step of performing authentication with the second electronic device by the first electronic device using the first communication identity and the second communication identity comprises:

generating a first authentication password by the first electronic device using the first communication identity and the second communication identity; and sending a first authentication message to a server by the first electronic device, wherein the server performs the authentication based on the first authentication message sent from the first electronic device and a second authentication message sent from the second electronic device, the first authentication message comprises the first authentication password and first address information of the first electronic device, the second authentication message comprises a second authentication password and the second address information of the second electronic device, and the second authentication password is generated by the second electronic device using the first communication identity and the second communication identity.

4. The method according to claim 3, wherein the step of sending the second communication connection request to the second electronic device by the first electronic device using the second address information of the second electronic device to establish the second path with the second electronic device comprises:

determining whether the first electronic device and the second electronic device satisfy a second preset condition by the first electronic device using the first address information of the first electronic device and the second address information of the second electronic device, and obtaining a second determination result;

in the case that the second determination result indicates that the first electronic device and the second electronic device satisfy the second preset condition, sending a point-to-point connection request to the second electronic device by the first electronic device;

in the case that the second determination result indicates that the first electronic device and the second electronic device do not satisfy the second preset condition, initiating a TCP connection request to the second electronic device by the first electronic device using the second address information, wherein the server informs the second electronic device to initiate the TCP connection request to the first electronic device; and approving the TCP connection request from the second electronic device by the first electronic device to establish the second path with the second electronic device.

5. The method according to claim 4, wherein the first address information of the first electronic device comprises an IP address of the first electronic device and the second address information of the second electronic device comprises an IP address of the second electronic device; and wherein the step of determining whether the first electronic device and the second electronic device satisfy a second preset condition by the first electronic device using the first address information of the first electronic device and the second address information of the second electronic device and obtaining a second determination result comprises:

comparing the IP address of the first electronic device and the IP address of the second electronic device to determine whether the first electronic device and the second electronic device are located in a same Local Area Network, determining that the second preset condition is satisfied if the first electronic device and the second electronic device are in the same Local Area Network, and determining that the second preset condition is not satisfied if the first electronic device and the second electronic device are not in the same Local Area Network.

6. The method according to claim 1, wherein the second path correlates with the first path in a way that:

the second path is disconnected when the first path is disconnected; and/or the first path is adapted to transmit first data and the second path is adapted to transmit second data, wherein the first data is different from the second data, and the first data and the second data are transmitted simultaneously via the first path and the second path, respectively.

7. The method according to claim 1, wherein the first preset condition comprises that:

the content of the response message is that the second electronic device approves the first communication connection request.

8. The method according to claim 1, wherein in the case that the first determination result indicates that the content of the response message satisfies the first preset condition, before sending the second communication connection request to the second electronic device through the first path and establishing the second path with the second electronic device based on the second protocol by the first electronic device, the method further comprises:

detecting a user operation, determining whether the user operation satisfies a third preset condition, and obtaining a third determination result; and in the case that the third determination result indicates that the user operation satisfies the third preset condition, performing the step of sending the second communication connection request to the second electronic device through the first path.

9. The method according to claim 1, further comprising:

detecting a first operation by the first electronic device;

generating a first control signaling based on the first operation;

executing the first control signaling by the first electronic device and obtaining a first execution result; and when the first electronic device executes the first control signaling, sending the first control signaling to the second electronic device by the first electronic device through the second path, wherein the second electronic device execute the first control signaling to obtain a second execution result, and the second execution result is the same as the first execution result.

10. The method according to claim 1, wherein the first electronic device comprises at least a first area and a second area, the second electronic device comprises at least a fourth area, the method further comprises:
   detecting a second operation of a user in the first area, determining whether the second operation satisfies a fourth preset condition and obtaining a fourth determination result, wherein the second operation is an operation associated with moving a target;
   in the case that the fourth determination result indicates that the second operation satisfies the fourth preset condition, obtaining a first target corresponding to the second operation and displaying the first target in the second area; and
   sending the first target to the second electronic device through the second path, wherein the first target is displayed in the fourth area of the second electronic device;
   wherein the first area of the first electronic device corresponds to third data configured to be in a protected state, the second area of the first electronic device corresponds to fourth data configured to be in a shared state, the fourth area of the second electronic device corresponds to fifth data configured to be in the shared state, and the fifth data is same as the third data.

11. The method according to claim 10, wherein the step of determining whether the second operation satisfies a fourth preset condition and obtaining a fourth determination result comprises:
   determining that the second operation satisfies the fourth preset condition in the case that the second operation is an operation of sliding from the first area to the second area; or
   determining that the second operation satisfies the fourth preset condition in the case that a first touch point associated with the second operation corresponds to a first object in the first area and a second touch point associated with the second operation corresponds to a first location in the second area.

12. The method according to claim 1, wherein the first electronic device comprises a second area and the second electronic device comprises a fourth area, the method further comprises:
   detecting a third operation and obtaining sixth data based on the third operation, by the first electronic device;
   storing the sixth data and a timestamp corresponding to the sixth data and sending the sixth data and the timestamp corresponding to the sixth data to the second electronic device through the second path, by the first electronic device, wherein the second electronic device display the sixth data in the fourth area based on the timestamp corresponding to the sixth data;
   receiving seventh data and a timestamp corresponding to the seventh data sent from the second electronic device through the second path and storing the seventh data and the timestamp corresponding to the seventh data, by the first electronic device, wherein the seventh data is generated by the second electronic device based on a detected fourth operation, and the seventh data and the timestamp corresponding to the seventh data are stored by the second electronic device; and
   displaying the sixth data and the seventh data in a superimposed way in the second area by the first electronic device according to an order of the timestamps.

13. The method according to claim 1 further comprising:
   receiving eighth data sent from the second electronic device through the second path, and displaying ninth data of the first electronic device and the eighth data of the second electronic device in a combined way.

14. A first electronic device comprising a processor and a non-transitory Processor-readable medium having processor-executable instructions stored Thereon that, when executed by the processor, cause the first electronic device to:
   send a first communication connection request to a second electronic device to establish a first path with the second electronic device based on a first protocol;
   receive a response message, determine whether the content of the response message satisfies a first preset condition, and obtain a first determination result; and
   send a second communication connection request to the second electronic device through the established first path to establish a second path with the second electronic device based on a second protocol in the case that the first determination result indicates that the content of the response message satisfies the first preset condition, wherein the first protocol is different from the second protocol and the first path correlates with the second path.

15. The first electronic device according to claim 14, wherein the first path is a voice link and the second path is a data link.

16. The first electronic device according to claim 14, further comprising an image projection module and an image capturing module, wherein a projection area of the image projection module at least partially coincides with a capturing area of the image capturing module.

* * * * *